April 28, 1959 L. J. ANDRES 2,883,922
HOT BEVERAGE MACHINE
Filed Dec. 13, 1956 5 Sheets-Sheet 1

Inventor
Lloyd J. Andres

April 28, 1959   L. J. ANDRES   2,883,922
HOT BEVERAGE MACHINE
Filed Dec. 13, 1956   5 Sheets-Sheet 2

Inventor
Lloyd J. Andres

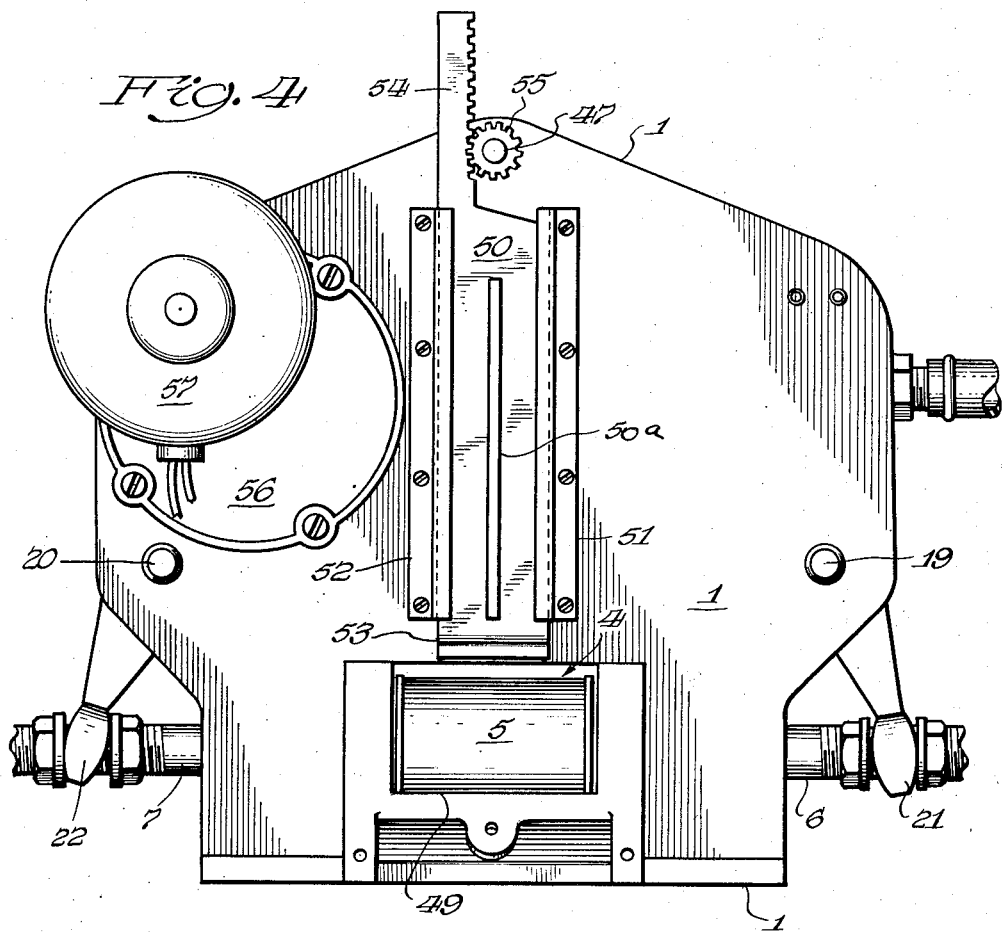
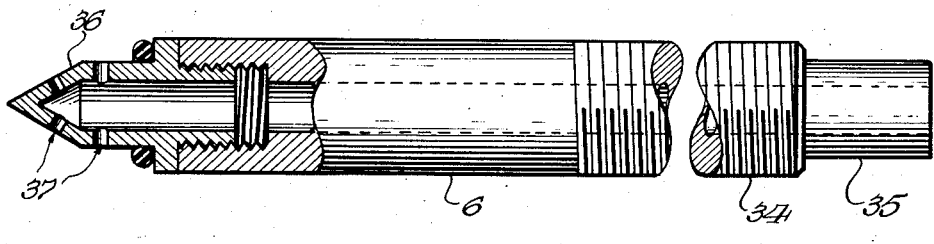
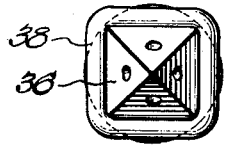

April 28, 1959　　　　L. J. ANDRES　　　　2,883,922
HOT BEVERAGE MACHINE
Filed Dec. 13, 1956　　　　　　　　　　5 Sheets-Sheet 4
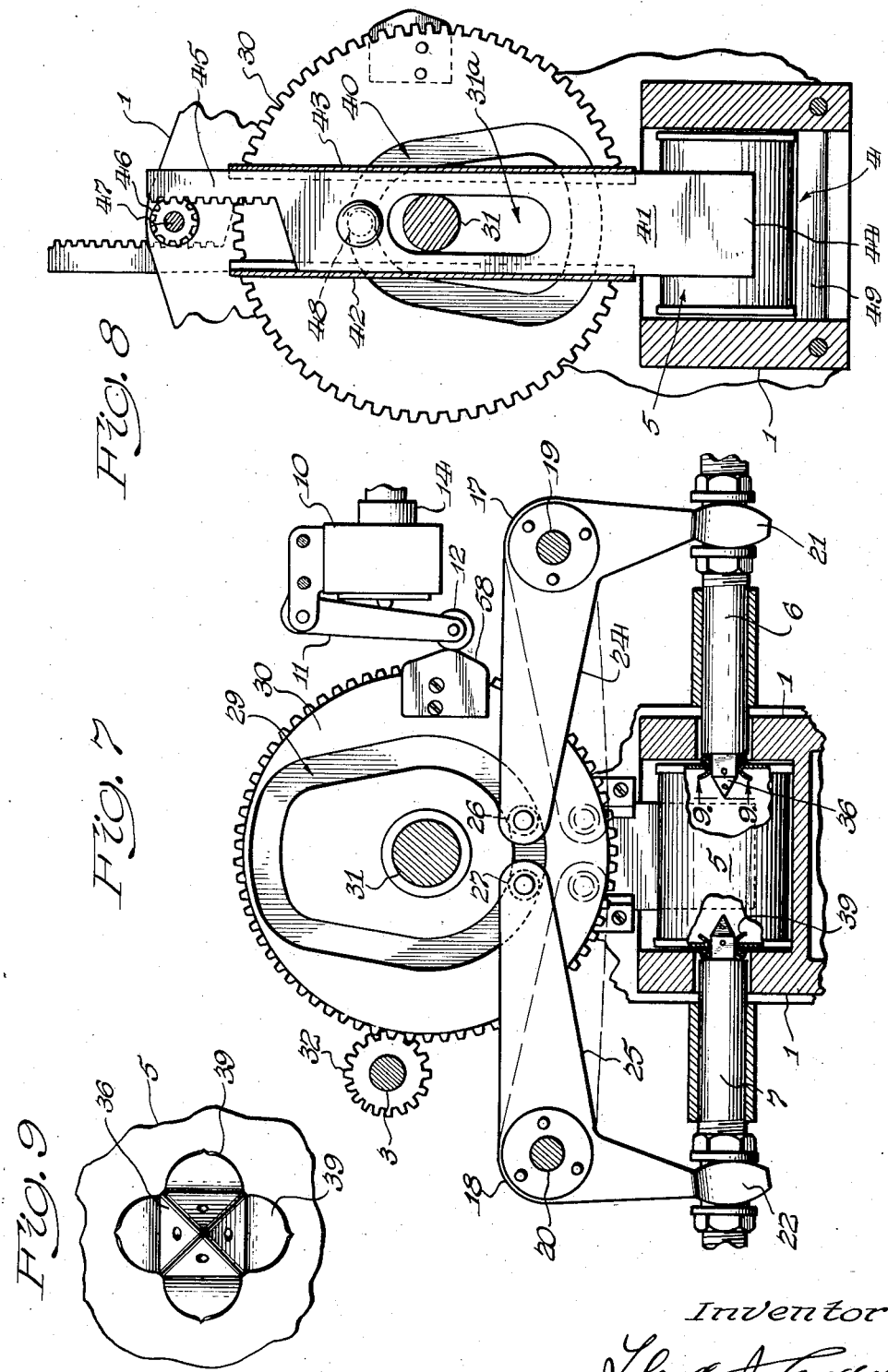
Inventor
Lloyd J. Andres

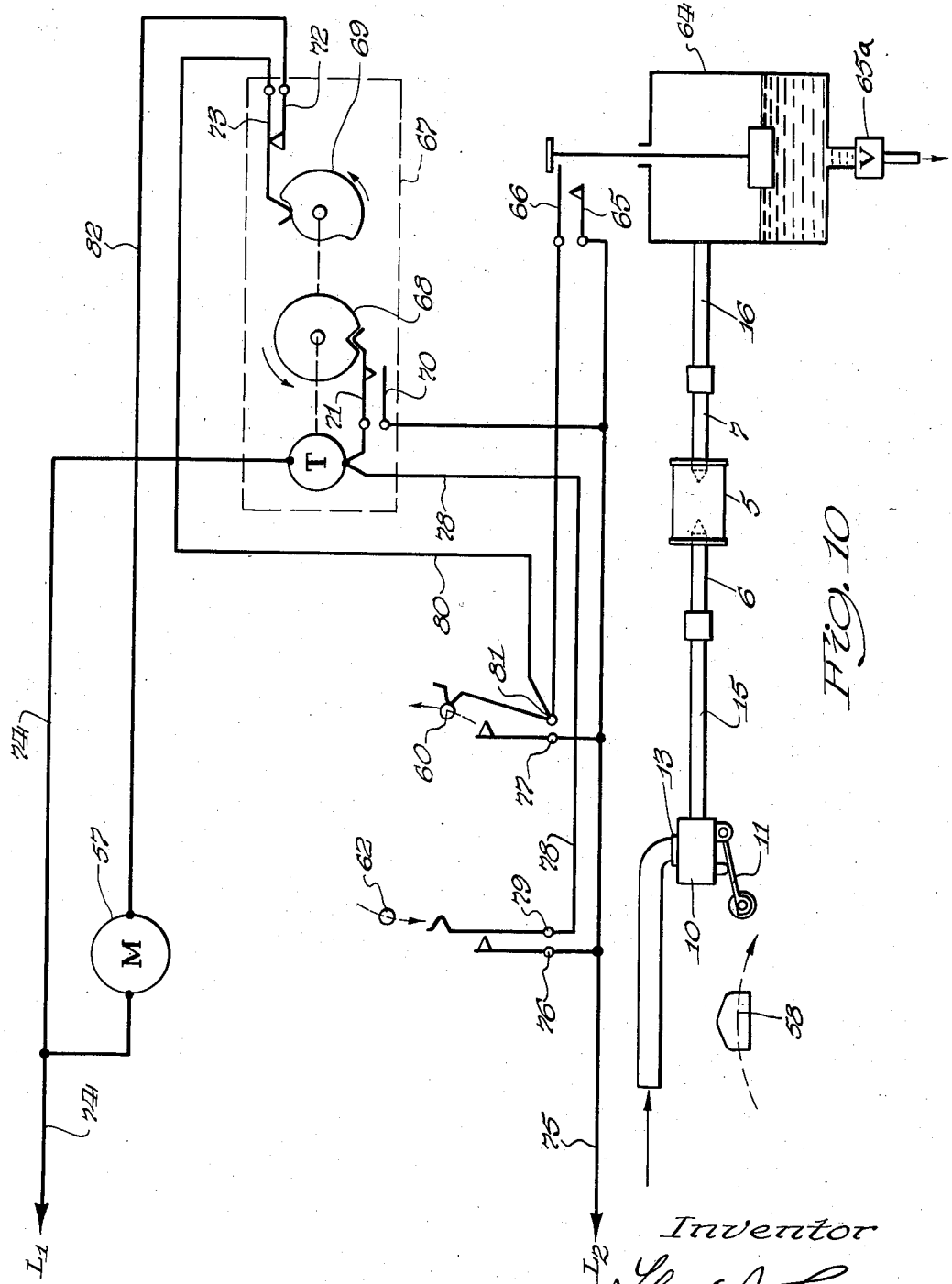

United States Patent Office 2,883,922
Patented Apr. 28, 1959

2,883,922

HOT BEVERAGE MACHINE

Lloyd J. Andres, Miami, Fla., assignor to Apco, Inc., a New York company

Application December 13, 1956, Serial No. 628,163

5 Claims. (Cl. 99—283)

This invention relates in general to automatic machines for making unit quantities of coffee, tea and like infusion beverage and more particularly, to a machine which is adapted to receive metal containers or cans in sequence in which granulated solid beverage ingredients are sealed. Each container fed into the machine is used as an infusion canister by piercing opposite ends thereof and passing heated water through the container to produce a beverage therein by infusion.

Reference is made to my pending U.S. patent application Serial No. 607,730 filed September 4, 1956, now abandoned, which describes a container which may be used to advantage with the machine hereinafter described.

Machines prior to this invention usually include a hopper for retaining a bulk quantity of ingredients and utilizes one or more mechanized canisters for receiving the ingredients and hot liquid for the infusion process and following the discharge of the finished beverage additional means were provided in machines of this character for rinsing the spent ingredients from the canister, resulting in fluid and waste products of considerable bulk when stored in a receptacle or conducted to a waste drain. Furthermore, machines of this type are relatively expensive, difficult to service and their use presents a questionable degree of sanitation.

The present invention overcomes the above objects and disadvantages by the provision of an automatic machine in which the ingredients and liquid used for the beverage remain sealed prior to and during the infusion of the beverage. Thus, the flavor factors of the ingredients are preserved until the moment of use.

The machine hereinafter described is relatively simple, easy to service, and presents a high degree of sanitation and the relatively dry spent ingredients remain in the containers for convenient disposal thereof.

A principal object of the invention is the provision of a mechanism for sequentially feeding a plurality of gravity propelled cylindrical containers therein and piercing opposite ends of each container, injecting hot water in one end and conducting a finished beverage from the opposite end thereof.

Another object of the invention is the provision of a reciprocating gate means for sequentially indexing and positioning each of a plurality of gravity propelled containers in a piercing station including the provision of a pair of reciprocating fluid conducting probes for piercing opposite ends of the container.

A further object of the invention is the provision in a beverage machine of a master cam for operating the above mentioned gate means the piercing probes and controlling the flow of hot water for each revolution thereof.

A further object of the invention is the provision of electric and hydraulic control means for a beverage machine in which a container having sealed ingredients therein is automatically processed to produce a unit volume of beverage for each cycle of said machine.

These and other objects and advantages in one embodiment of the invention are described and shown in the appended specification and drawings in which:

Fig. 4 is a rear elevation of the machine shown in Fig. 1.

Fig. 5 is an enlarged sectional side view of a probe element.

Fig. 6 is a front end view of the element shown Fig. 5.

Fig. 7 is a fragmentary cross-sectional view of the machine as shown in Fig. 4 with elements in changed position.

Fig. 8 is a fragmentary cross-sectional view of the machine shown in Fig. 1.

Fig. 9 is an enlarged end view of the probe pierce of a container shown in Figures 3 and 7.

Fig. 10 is a schematic diagram of preferred controls and connections for machine shown Fig. 1.

Figure 1:
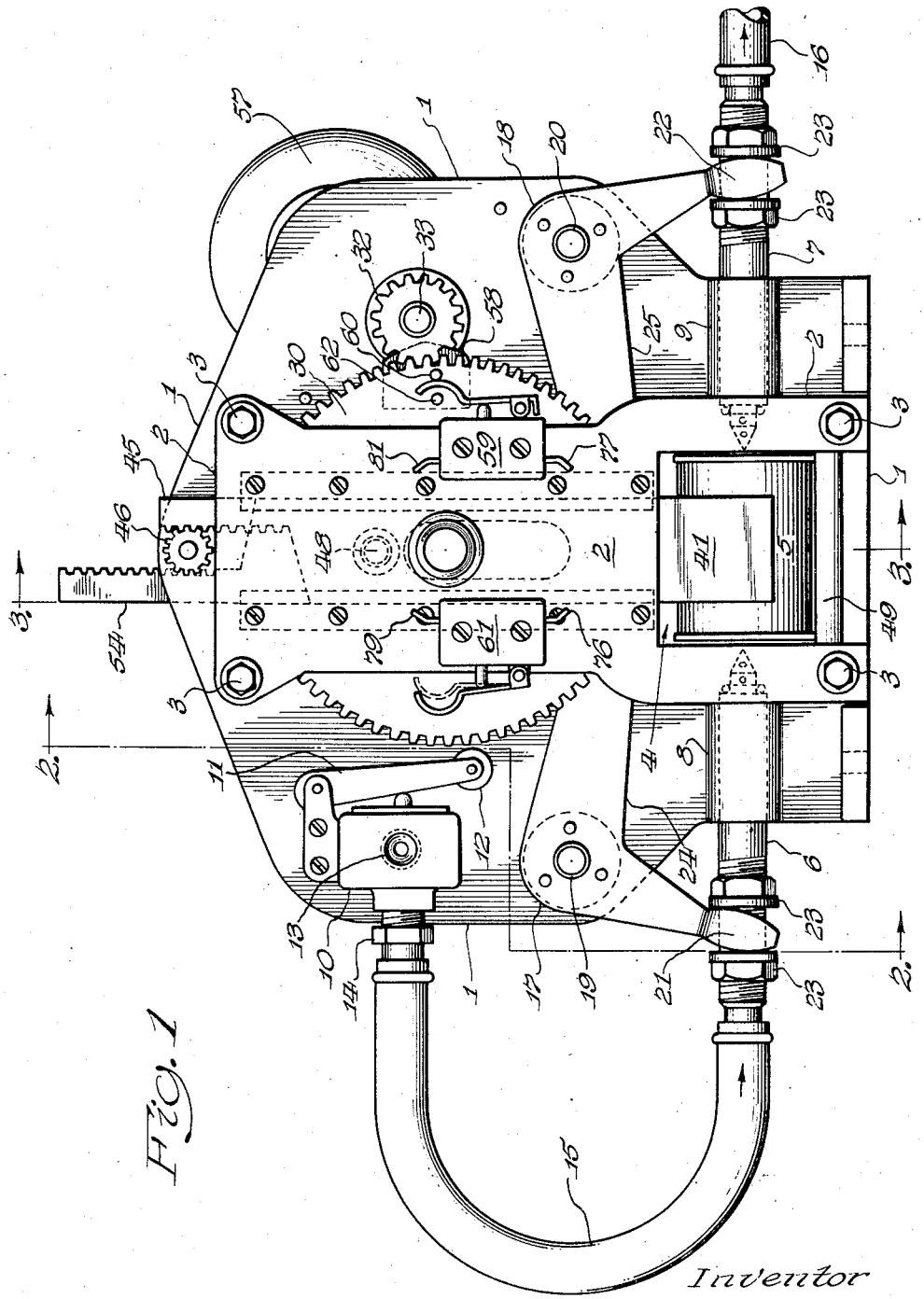
Fig. 1 is a front elevation of the machine.

Referring to Fig. 1, all elements of the machine are supported by a main frame 1, and a front plate 2 retained in position shown by screws 3. A rectangular opening in the frame 1 and plate 2 provide a piercing station 4 through which containers 5 will descend by action of gravity when released. The distance between the side walls of the station is slightly greater than the height of the cylindrical containers to be used.

A pair of hollow probe assemblies 6 and 7 are slideably positioned to enter the station 4 in coaxial bores in the bosses 8 and 9 integral with frame 1.

A normally closed hot water valve 10 having an operating arm 11 and roller 12 is secured to frame 1 as shown. The valve inlet 13 is intended to be connected to a source of pressurized hot water and its outlet 14 is connected to probe 6 by a flexible conduit 15.

The probe 7 is connected to a flexible conduit for conducting the beverage from the machine.

A pair of oppositely disposed bell cranks 17 and 18 are journalled for oscillation on studs 19 and 20 secured in frame 1. The short arms of cranks 19 and 20 terminate in forks 21 and 22 respectively and straddle probes 6 and 7 between adjustable nuts 23 threaded on the outer end portions of the probes, as shown.

Referring to Fig. 7, the long arms 24 and 25 of cranks 17 and 18 terminate in follower studs 26 and 27 which are engaged in an endless channel 29 in the rear side of a cam 30. The cam 30 is fixed to shaft 31 journalled in frame 1 and plate 2 (better shown in Fig. 3), and is provided with gear teeth around its outer periphery engaged with a pinion 32 secured to a drive shaft 33.

It is now apparent that when the probes are in rest position as shown in Fig. 1 and the cam 30 is rotated 180 degrees, the cranks 17 and 18 will drive the probes inward and pierce both ends of a can retained in station 4 as shown in Fig. 7. A further 180 degree rotation of cam 30 will retract the probes to their original positions shown in Fig. 1.

Referring to Figures 5 and 6, each probe assembly consists of cylindrical hollow body 6 having a threaded portion 34 to retain the adjustable nuts 23 and terminating in a conduit connection 35. The opposite end of the body is internally threaded to retain a pyramidal point member 36 which is also hollow and provided with a plurality of holes 37 for diffusing water into the can in the case of one probe and for conducting and discharging the beverage from the other. An elastomer O ring 38 is stretched around the small diameter of the point member to provide a seal against the outer surface of the can lid when inserted therein. The approximate configuration of the pierced lobes 39 formed in the can lid is shown in Figures 7 and 9.

Referring to Fig. 8 the front face of cam 30 has channel configuration 40 therein for operating the escapement gates for sequentially feeding and positioning the cans in the piercing station. A stop gate 41 is slideably retained on the inner side of plate 2 by fixed guide members 42 and 43.

The lower end 44 of the gate 41 serves as a stop for the container in the station 4 when in its lowermost position. The upper end 45 is provided with rack gear teeth in engagement with a pinion 46 secured to shaft 47. Since shaft 31 intersects gate 41, a clearance aperture 31a is provided in the gate to permit vertical movement thereof.

An inward projecting stud 48 secured in gate 41 is in engagement with channel 40 in cam 30. Thus, when the cam 30 is rotated 180 degrees, the gate will move upward to a position to release the foremost can 5 in the station to descend by gravity down the inclined runway 49 into a disposal receptacle, not shown.

Figure 3:
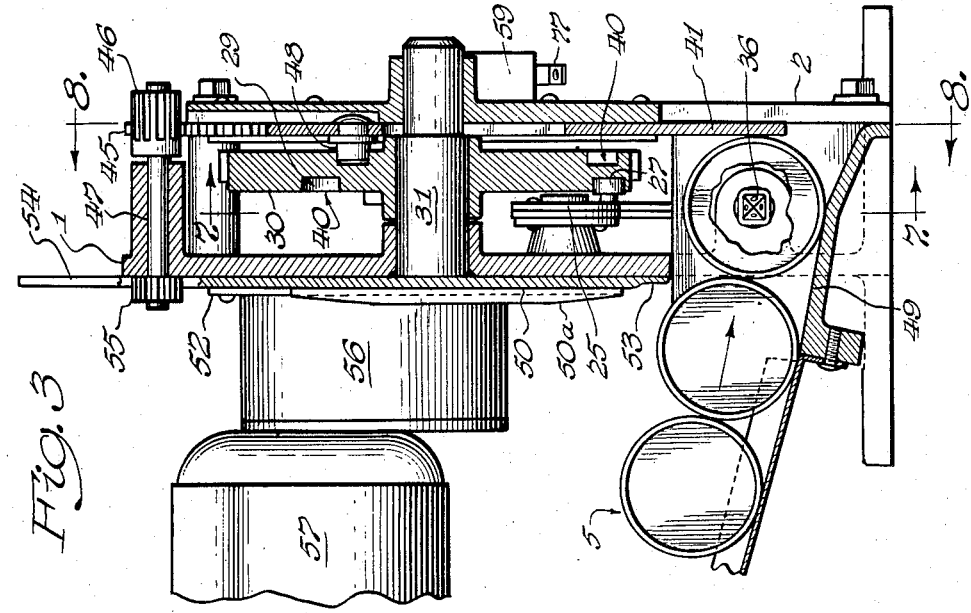
Fig. 3 is a cross-sectional side elevation taken through section line 3—3, Fig. 1.

Referring to Fig. 4, a second gate 50 reinforced by rib 50a of the escapement is slideably secured to the outer side of frame 1 by fixed guides 51 and 52. The lower end 53 of the gate is adapted to be projected between the foremost can in the station and the adjacent can on runway 49. The upper end 54 is provided with rack gear teeth engaged with a pinion 55 secured on shaft 47 journalled in a suitable bearing in frame 1, better shown in Fig. 3. It is now apparent that when the cam 30 is rotated one revolution the gates 41 and 50 will reciprocate in opposite directions to release and discharge the foremost can in the station and permit the next can to roll into the piercing station as shown in Figures 2 and 3.

Figure 2:
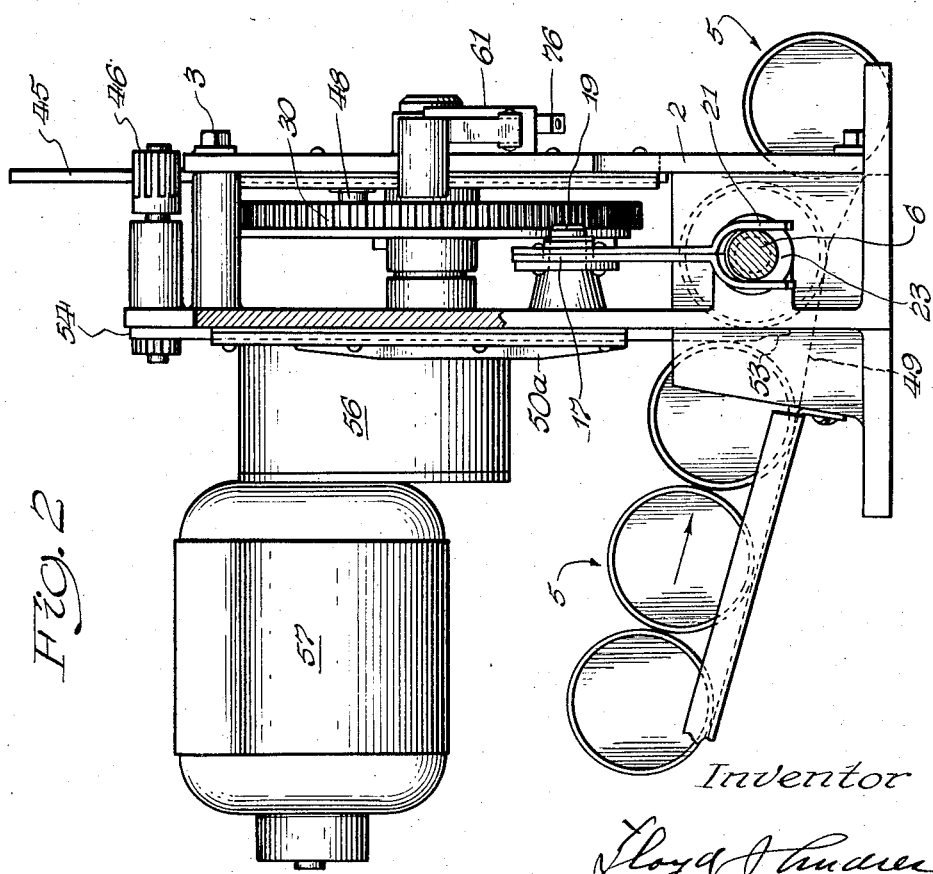
Fig. 2 is a cross-sectional side elevation taken through section line 2—2, Fig. 1.

A gear reduction unit 56 and drive motor 57 are secured to frame 1 for driving shaft 33 and pinion 32 previously described and shown in Figures 1, 2 and 4.

Referring to Figures 1 and 7, a cam plate 58 is secured to the main cam 30 and positioned to open the water valve 10 when the cam has rotated to complete the piercing of a can, and to close said valve when the cam continues its rotation following the infusion cycle.

A normally closed one revolution holding switch 59 secured to plate 2 has its operating arm extending inward in the path of movement of pin 60 on outer face of cam 30, and a normally closed timer control switch 61 has its operating arm extending in the path of movement of a pin 62 also in the outer face of cam 30.

Referring to Fig. 10, the connection 13 of valve 10 is connected to a source of hot water by a conduit and the beverage conduit 16 is connected to a reservoir 64 having a valve controlling outlet 65a. The reservoir includes a float controlled level switch 65—66.

A timer assembly 67 consists of motor T for rotating a one revolution cam and a water interval cam 69. A normally open switch 70—71 rides cam 68 and a normally closed switch 72—73 rides a cam 69.

A conductor 74 connects one terminal of drive motor 57 and one terminal of motor T to power line $L_1$.

A conductor 75 is connected to blade 76 of timer control switch 61, blade 77 of switch 59, blade 65 of level switch, blade 70 of timer switch and the remaining side of the power line $L_2$.

A conductor 78 connects blade 79, one terminal of timer motor T and blade 71 of the timer switch.

A conductor 80 connects blade 81 of switch 59 and blade 73 of the interval switch and blade 66 of the level switch.

A conductor 82 connects blade 72 of the interval switch to the remaining terminal of motor 57.

In operation and referring to Fig. 10, under the assumption the machine is in rest position as shown in Fig. 1 and connected to a source of hot water, a source of electric power and that a plurality of cans containing beverage ingredients are positioned in runway 49, then when reservoir switch 65—66 is momentarily closed, the motor 57 will be energized and the main cam 30 will begin rotation and continue its rotation by virtue of the closure of blades 77—81 of the holding switch 59.

During the first 180 degrees rotation of cam 30 the probes 6 and 7 will pierce both ends of a can retained in the piercing station. During this movement, the blades 41 and 53 will begin their reciprocal travel. Near the end of this first movement of cam 30, the probes will be in sealed relation with the can and water valve 10 will be opened by cam plate 58 operating the valve arm 11 to permit the flow of hot water through probe 6 into the can to infuse with the ingredients therein.

Also near the end of the first half revolution of cam 30, the timer control switch blades 76—79 will close and energize the timer motor which in turn, will operate switch 72—73 and de-energize the driving motor 57 for a predetermined infusion period to permit the complete infusion of the ingredients in the can and the simultaneous discharge of beverage through probe 7 through conduit 16 into reservoir 64.

At the end of the said infusion period, the timer will re-energize the motor 57 and the cam will continue its rotation to retrieve the probes from the cam to the position shown in Fig. 1 when the switch 59 is opened by pin 60 to de-energize and stop motor 57. During this return portion of the cycle, the spent can will discharge by gravity from the machine and a subsequent can temporarily held by blade 50 will be released thereby to the piercing station and rest against the now descended end 44 of blade 41.

Having described my invention, I claim:

1. A hot beverage machine for using sealed cans containing infusion type beverage ingredients comprising means forming a frame and a runway for conducting a plurality of gravity propelled cylindrical cans in a predetermined path, a piercing station in said frame over said runway having parallel spaced fixed side walls, a pair of fluid conducting probes slideably retained in said frame, each of said probes terminating at one end in a foraminated piercing tip, a resilient seal means positioned around the base of each said tip, each of said probes positioned to permit each said tip to enter and retract from said station through opposite said walls from opposite directions when operated, cam unit means journalled for rotation in said frame, power means associated with said cam means for rotating the latter when energized, a pair of independent levers pivotally secured for oscillation on said frame for reciprocating said probes when operated, one end of each of said levers in follower engagement with said cam means and each opposite end thereof in operative engagement with each of said probes, a can indexing means adapted to be driven by said cam means for sequentially releasing and to temporarily hold each of a plurality of said cans in said station on said runway during one revolution of said cam means, one of said probes connected to a source of pressurized hot water and the other said probe connected to an outlet conduit whereby energizing said power means for a first period said cam means will rotate one part of one revolution and project said probe tips through opposite ends of a said can retained between said sidewalls in said station by said indexing means and engaging said sealing means against opposite ends of said can to permit said hot water to be conducted through one said probe into said can for infusion with said ingredients and to permit the discharge of the resulting beverage from said other probe into said outlet conduit and whereby energizing said power means for a second period will rotate said cam means through the remaining part of said revolution and retract said tips from said can and operate said indexing means to release said can to gravitate from said station.

2. A hot beverage machine for using sealed cans containing infusion type beverage ingredients comprising means forming a frame and a runway for conducting a plurality of gravity propelled cylindrical cans in a predetermined path, a piercing station in said frame over said runway having parallel spaced fixed side walls, a pair of indexing gates slideably secured in said frame and positioned in parallel spaced relation, each of said gates adapted to reciprocate from a position above the entrance and exit of said station respectively for temporarily holding each of said cans in said station, cam means journalled for rotation in said frame, power means associated with said cam means for rotating the latter when energized, reciprocating drive means operatively connected to said gates and in follower engagement with said cam means for simultaneously reciprocating said gates in opposite directions for holding therebetween and releasing the foremost of said cans into and from said station during one revolution of said cam means, a pair of liquid conducting probes positioned for movement in said frame from opposite said side walls of said station for piercing into opposite ends of a said can retained in said station, lever means operatively connecting said probes in follower engagement with said cam means for driving said probes into and retracting them from said can during the said one revolution of said cam means, a source of water connected to one of said probes and a discharge conduit connected to the other of said probes whereby each of said cans on said runway will be sequentially pierced by said probes and water conducted through the said one probe into each of said cans and the resultant beverage conducted therefrom by said other probe through said outlet conduit while each said can is retained in said station by said indexing means when said power means is energized for a period to rotate said cam means one revolution.

3. A hot beverage machine for using sealed cans containing infusion type beverage ingredients comprising means forming a frame, a piercing station in said frame having parallel spaced fixed side walls for receiving each of said cans rolling by gravity therein about its principal axis with opposite ends thereof adjacent said walls, a pair of indexing gates slideably secured in said frame and positioned to straddle said station in parallel spaced relation, each of said gates adapted to reciprocate into the entrance and exit of said station respectively, unit cam means journalled for rotation in said frame, said cam means having a continuous indexing and separate continuous piercing conformations therein including a valve cam thereon, said conformations and said valve cam positioned on said cam means in predetermined radial relation, electric power and control means associated with said cam means for intermittently rotating the latter to and from a predetermined dwell period during each revolution thereof when energized, reciprocating drive means operatively connecting said gates with said indexing conformation in said cam means for simultaneously reciprocating said gates in opposite directions for admitting, holding and releasing each one of said cans during a first portion of one revolution of said cam means, a pair of fluid conducting probes movably retained in said frame, each of said probes terminating at one end in a foraminated piercing tip, each of said probes positioned and adapted to permit each said tip end thereof to project into and retract from opposite said walls of said station when operated, a resilient seal means positioned around each probe a predetermined distance from the end of each said tip, a pair of independent levers pivotally secured for oscillation in said frame for independently operating said probes, one end of each of said levers in follower engagement with said piercing formation on said cam means and the other end thereof in operative engagement with each of said probes for projecting and retracting said probes during predetermined periods of said one revolution of said cam means, a normally closed fluid valve in said frame having an operating means positioned in the path of movement of said valve cam for operation thereby, the inlet of said valve connected to a source of pressurized water and the outlet thereof connected by a flexible conduit to one of said probes whereby each of said cans fed to said piercing station will be indexed therein by said gates during said first portion of one revolution of said cam means and the continued rotation of said cam means will project said piercing tips through opposite ends of said can with said seal means against the opposite said ends of said can and further movement of said cam means will move said valve cam, operate said valve and release water through said one probe, through said can and for infusion with ingredients therein and discharge the resultant beverage from said other probe during said dwell of said cam means and whereby the continued rotation of said one revolution of said cam means will retract said probes from said can and operate said gates and release said can and sequentially receive a subsequent can for another cycle of the machine when said power and control means is energized.

4. A hot beverage machine comprising means forming a frame including a runway for conducting a plurality of gravity propelled cans therethrough, a piercing station in said frame on said runway, a main cam means journalled for rotation in said frame, a feeding mechanism in said frame associated with and responsive to rotation of said cam means for feeding each of said cans into and out of said station when said main cam is rotated, electric power means adapted to rotate said main cam means when energized, a source of pressurized hot water, a water conducting probe movably positioned in said frame having one end thereof adapted for movement into said piercing station for piercing and sealing against one end of a can retained therein, a beverage conducting probe movably positioned in said frame having one end thereof adapted for movement into the opposite said side of said station for piercing and sealing against the opposite side of said can retained therein, independent lever means in said frame articulated with each said probe and said main cam means for reciprocating said probes in opposite directions when said cam means is rotated, water valve means connected to a source of pressurized water and said water probe for conducting water through said probe into said can and the finished beverage from said can through said beverage probe when operated, a valve cam on said main cam for operating said valve when said main cam is rotated to a predetermined infusion position, electric switch means on said frame responsive to the rotation of said main cam means at said infusion position, an electric timer adapted to open an electric circuit for a predetermined period when energized, a source of electric energy and electric circuit means connecting said cam means said switch means said timer said power means with said source of energy whereby said circuit will energize and rotate said cam means to feed and pierce one of said cans and operate said switch means in predetermined sequence and whereby said timer will de-energize and stop said main cam means when said valve cam is in said infusion position for conducting said water through said can for a predetermined period and following said period said timer will re-energize said cam means to discharge said can from said station and continue its rotation for processing the next successive one of said cans.

5. In a beverage machine of the character described, means forming a frame including a runway for conducting gravity propelled cylindrical cans retaining beverage ingredients in a predetermined path, a piercing station in said frame over said runway, a cam means journalled for rotation on said frame, power means for rotating said cam means in one direction when energized, a source of water, piercing means in said frame associated with said station and connected to said source of water adapted to pierce opposite ends of each of said cans retained in said station for conducting said water therein and the resultant infused beverage therefrom when operated, lever means on said frame articulated with said piercing means and said cam means responsive to rotation of the latter for operating said piercing means, independent entrance and exit gates slideably secured for reciprocation at the entrance and exit of said station respectively, a cam follower on one of said gates engaged with said cam means adapted to reciprocate said gate into and out said path in predetermined timed relation with said piercing means when said cam is rotated, reversing gear means connecting said entrance gate to said exit gates for transmitting opposite movement thereto when the said one gate is operated whereby the opposite reciprocation of said gates will index and retain each of said cans descending on said runway in said station for piercing said can by said piercing means when said power means is energized.

References Cited in the file of this patent

UNITED STATES PATENTS

| | | |
|---|---|---|
| 1,366,858 | Anderson et al. | Jan. 25, 1921 |
| 1,377,316 | Clermont | May 10, 1921 |
| 1,551,855 | Svendsgaard | Sept. 1, 1925 |
| 2,256,976 | Ford | Sept. 23, 1941 |
| 2,274,325 | Ford | Feb. 24, 1942 |
| 2,451,195 | Brown | Oct. 12, 1948 |
| 2,516,174 | Baumgard | July 25, 1950 |
| 2,609,982 | Johnson | Sept. 9, 1952 |
| 2,618,407 | Thorn | Nov. 18, 1952 |
| 2,710,115 | Chandler | June 7, 1955 |
| 2,734,658 | Poitras | Feb. 14, 1956 |
| 2,765,005 | Wellekens | Oct. 2, 1956 |